June 24, 1924.
G. W. MULLEN
1,498,564
METHOD OF PRODUCING PRECIPITATED ANTIMONY SULPHIDE
Filed Nov. 14, 1922
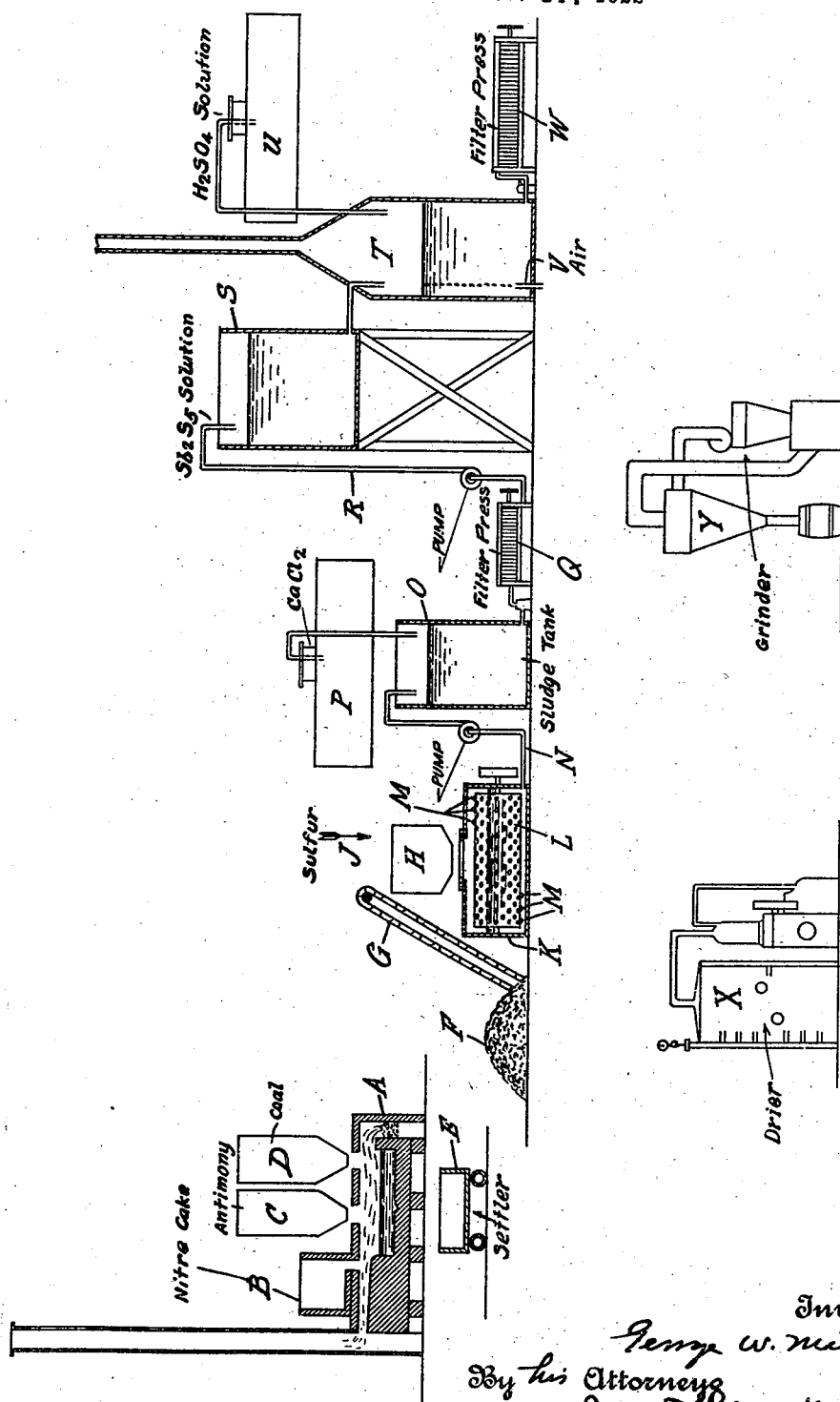
Inventor
George W. Mullen
By his Attorneys Patented June 24, 1924.

1,498,564

UNITED STATES PATENT OFFICE.

GEORGE WILBUR MULLEN, OF ELMHURST, NEW YORK, ASSIGNOR TO HOWARD B. BISHOP, OF NEW YORK, N. Y.

METHOD OF PRODUCING PRECIPITATED ANTIMONY SULPHIDE.

Application filed November 14, 1922. Serial No. 600,790.

*To all whom it may concern:*

Be it known that I, GEORGE W. MULLEN, a citizen of the United States of America, and a resident of Elmhurst, in the borough and county of Queens, city and State of New York, have invented certain new and useful Improvements in Methods of Producing Precipitated Antimony Sulphide, of which the following is a specification.

This invention relates to the production of precipitated antimony sulphide, and has for its object to provide a process which can be carried out economically at a relatively low temperature and which will yield the product desired under conditions that will preclude losses due to decomposition of the product and that will accomplish the removal of certain undesirable by-products.

Heretofore antimony ore (Stibnite, $Sb_2S_3$) has been used as the raw material in the manufacture of precipitated antimony sulphides. I have found that much better results are obtained by starting with metallic antimony and nitre cake and subjecting them to my novel treatment, which will be set forth in detail hereinafter, its novel features being particularly pointed out in the appended claims.

An apparatus suitable for carrying out my improved method is illustrated by the accompanying drawing, in diagrammatic elevation, with parts in section.

A designates a reverberatory furnace, preferably carrying at its top a container B for the nitre cake, so that the latter may be preheated before being admitted to the interior of said furnace. Hoppers C, D or other suitable means are provided for feeding to the furnace A the raw antimony material (metallic antimony of commercial purity, that is to say, about 99%), and a reducing agent (coal), respectively. The molten product passes from the outlet of the furnace to a settler E, generally made as a car, in which the molten material is allowed to cool and solidify, whereupon it is crushed. At F I have indicated a heap of such crushed material, which is then taken up by an elevator G and dropped into a hopper H which may also receive, as at J, a certain amount of sulfur in pieces of suitable size to enter the casing K of a disintegrator. This disintegrator comprises a perforated cylinder L rotated within the cylindrical casing K and preferably provided on its outer surface with paddles M to agitate the water with which said casing is filled. Steam coils or other suitable means (not shown) may be provided for heating the disintegrator. An outlet pipe N for the liquid (with pump, if required) leads to a sludge tank O adapted to receive calcium chloride from a storage tank P. The outlet of the sludge tank is connected with a filter press Q, from which the liquid (antimony pentasulfide solution) passes through a pipe R to another storage tank S. The outlet of the latter tank is connected with the upper portion of a precipitating tank T, which also receives sulfuric acid from a storage tank U and compressed air through a pipe V. The outlet at the bottom of the precipitating tank T is connected with a filter press W. The solid retained by said press (filter press cake) is taken to a drier X and the dried product to a grinding apparatus Y.

In detail, the operation is conducted as follows: The crushed nitre cake and the metallic antimony supplied at B and C, respectively, should be in such proportion as to have about three parts (by weight) of nitre cake to one part of antimony. The nitre cake (preheated until water has been expelled), is admitted to the furnace first, and when it is molten, the antimony and the reducing agent (coal) are added. About ⅓ part of anthracite coal will be suitable. All these substances may be fed to the furnace together, if desired. The treatment of the mixture in the furnace A is continued for about from three to four hours, at a temperature of about 1000° centigrade, the furnace being closed by "claying." The reaction between metallic antimony and the sulfuric acid contained in the nitre cake produces antimony sulfate, but in the reducing atmosphere obtained by the addition of coal or its equivalent such antimony sulfate is reduced to antimony sulphide.

The reactions taking place in the furnace may be explained as follows: Nitre cake, $NaHSO_4$, may be considered as $Na_2SO_4 + H_2SO_4$. The molecular weight of $H_2SO_4$ is 98, that of $Na_2SO_4$ is 142, and that of nitre cake therefore 240, while that of antimony is 120. Therefore, if we take nitre cake and antimony in the molecular proportions of 3 to 2, the proportion of their weights will be as 3 times 240 to 2 times 120, or as 3 to 1, which is the proportion which has been indicated above. The reactions resulting from the treatment of 3 ($Na_2SO_4 + H_2SO_4$) and 2Sb (in the presence of carbon) are as follows: First, there is a reaction between the sulfuric acid and the antimony, (1) $3H_2SO_4 + 2Sb = Sb_2(SO_4)_3$.

The antimony sulfate thus formed reacts with carbon according to the equation (2) $Sb_2(SO_4)_3 + 6C = Sb_2S_3 + 6CO_2$.

On the other hand, the sodium sulfate of the nitre cake reacts with carbon according to the equation (3) $3Na_2SO_4 + 6C = 3Na_2S + 6CO_2$.

It will be seen that nitre cake contains sulfuric acid and sodium sulfate in just the right proportions to produce the desired reactions if nitre cake and antimony are used in the proportion of 3 to 1 (by weight), as indicated above. Inasmuch as the relatively low temperature of about 1000° centigrade is used, there is no loss of antimony by volatilization or by decomposition, and the time required for the treatment is shorter than in methods employed heretofore. The furnace has a basic lining (bauxite), and the nitre cake, (being acid in character), should not be left alone in contact with such lining for too long a time. Hence, the charge of antimony and coal should be added soon after the admission of the nitre cake, or even at the same time. The addition of the charge neutralizes the free acid of the nitre cake, so that there is no corrosive action on the bauxite brick lining. As will be understood from the equations given above, the melt, after the completion of the reaction, consists chiefly of antimony sulphide ($Sb_2S_3$) and sodium sulphide ($Na_2S$). The charge is then tapped into the settler E, where it is cooled and broken down. The broken melt is crushed to about ½ inch size or less, and by means of the elevator G, fed to the hopper H and thence, with sulfur added as at J, dropped into the water contained in the disintegrator casing K. The agitation produced by rotating the cylinder L causes all the soluble substances to become dissolved, steam heat or other heat being supplied, if desired, to hasten the process of solution. Under the effect of the heat of reaction and in the presence of the free caustic soda produced and of sodium sulphide, the sulfur becomes dissolved, probably in the form of $Na_2S$.

The reaction between the sodium sulphide and antimony sulphide (in the presence of oxygen) may be represented by the following equation:

(4) $3Na_2S + Sb_2S_3 + O = Na_2S + Sb_2S_5 + 2Na_2O$.

It is immaterial whether the sulphur be added at J, as described above, or previously; it may be even be added in the furnace A. The sulphur is dissolved probably as $Na_2S$ in the $Na_2O$ formed as indicated in equation (4). The lumps of material tumbled about in the cylinder L break each other up by mutual attrition, until they are fine enough to pass through the perforations of cylinder L, which are generally about $\frac{1}{8}$ of an inch in diameter. The solution is pumped or otherwise conveyed from the disintegrator to the sludge tank O, where sufficient calcium chloride is added (from tank P) to form a precipitate of calcium sulfate by reacting with the unreduced sodium sulfate present, and also enough to take care of the requirements for calcium sulfate later on in the process, if desired. This calcium sulfate residue (carrying with it any organic matter present), is filtered in the plate-and-frame filter press Q, and may be returned to the furnace if desired, or considered a waste material, since the amount is very small. The calcium chloride thus acts as a precipitant for the sodium sulfate, and also as a clarifier which effects the removal of organic material. Should the amount of sodium sulfate present be insufficient for the removal of organic matter, a suitable additional amount of sodium sulfate would be supplied to the sludge tank O. The reaction between the sodium sulfate and the calcium chloride may be expressed as follows:

(5) $Na_2SO_4 + CaCl_2 = CaSO_4 + 2NaCl$.

It will be understood that more calcium chloride is supplied than required by this reaction, so that the liquid leaving the filter press Q will contain some $CaCl_2$, besides the $Na_2S$ and the antimony pentasulfide $Sb_2S_5$ in solution. In the main, however, this liquid is a clear solution of antimony pentasulfide. The resulting clear antimony pentasulfide solution is conveyed through the pipe R to the storage tank S, and is then run slowly into the precipitating tank T containing a weak solution of sulfuric acid (say, 1%), an additional amount of such solution, in proper porportion, being supplied from the tank U as the antimony pentasulfide solution flows in. A constant stream of air is blown in through the pipe V and through the liquid to remove the hydrogen sulphide resulting from the action of the sulfuric acid, such sulphide being carried off through pipes connected with the top of the precipitating tank T, or burned up in the fire box. The two main reactions in the tank T may be represented as follows:

(6) $CaCl_2 + H_2SO_4 = CaSO_4 + HCl$, and (7) $Na_2S + Sb_2S_5 + 2HCl = NaCl + Sb_2S_5 + H_2S$.

The reason that I add enough calcium chloride to produce calcium sulfate is that I intend to produce the article known in commerce as "golden antimony sulphuret", which contains a certain amount of calcium sulfate. Furthermore, such golden antimony sulphuret, according to the trade specifications, is required to contain a certain proportion (from 15 to 17%) of free sulphur. As mentioned above, this sulfur, added at J or at any suitable earlier point, is dissolved in K and reaches the tank T as $Na_2S$. From this solution I precipitate sulfur by the action of the sulfuric acid, according to the equation (8) $(x+1)Na_2S + (x+1)H_2SO_4 =$
    $H_2S + (x+1)Na_2SO_4 + xS + 2xH$.

I therefore obtain in tank T a mixture of three precipitates, viz; precipitates of calcium sulfate, antimony pentasulfide, and sulfur, in the proportions required to constitute the trade product known as golden antimony sulphuret. I also obtain, in addition, a gaseous product, $H_2S$, and a solution of sodium chloride. The precipitate of sulfur, of calcium sulfate, and of antimony pentasulfide ($Sb_2S_5$), is separated from the liquid in the filter press W. The filter press cake is dried in the vacuum drier or other drier X and then ground in the grinding apparatus Y, which may be of the impact air classifier type. Generally, the antimony sulphide (called "golden antimony sulphuret" in the trade), is ground to pass through a 350 mesh screen. After grinding, the product is ready for the market.

Various modifications may be made without departing from the nature of my invention as set forth in the appended claims.

Instead of calcium chloride, I may use barium chloride, and while the claims specify calcium chloride, it is to be understood that barium chloride is covered as an equivalent.

I claim:

1. The process which consists in subjecting nitre cake and metallic antimony to a temperature of about 1000° C. in the presence of a reducing atmosphere, so as to produce antimony trisulfide and sodium sulphide, cooling and crushing the resulting melt, disintegrating it in the presence of an aqueous solvent and oxygen to obtain a solution containing antimony pentasulphide, adding calcium chloride to the solution, filtering, bringing the filtered solution in contact with sulfuric acid and blowing a current of air through the mixture of sulfuric acid and filtered solution, again filtering, and drying and grinding the solid removed by such second filtration.

2. The process which consists in heating nitre cake in the presence of metallic antimony in the presence of a reducing agent so as to produce antimony trisulfide and sodium sulphide, cooling and crushing the resulting melt, disintegrating it in the presence of an aqueous solvent and oxygen to obtain a solution containing antimony pentasulfide, adding calcium chloride to the solution thus obtained, separating the solution from the solids, bringing the separated solution in contact with sulfuric acid, and separating the liquid from the solid precipitate.

3. The process which consists in heating nitre cake in the presence of metallic antimony in the presence of a reducing agent so as to produce antimony trisulfide and sodium sulphide, cooling and crushing the resulting melt and disintegrating it in the presence of sulfur and of an aqueous solvent and oxygen to obtain a solution containing antimony pentasulfide, adding calcium chloride to the solution thus obtained, separating the solution from the solids, bringing the separated solution into contact with sulfuric acid, and separating the resulting precipitate from the liquid.

4. The process which consists in subjecting about three parts (by weight) of nitre cake and one part of metallic antimony to heat in a reducing atmosphere, so as to produce antimony trisulfide and sodium sulphide, cooling and crushing the resulting melt and disintegrating it in the presence of an aqueous solvent and oxygen to obtain a solution containing antimony pentasulfide, adding calcium chloride to the solution thus obtained, separating the solution from the solids, bringing the separated solution into contact with sulfuric acid, and separating the resulting precipitate from the liquid.

In testimony whereof I have hereunto set my hand.

GEORGE WILBUR MULLEN.